United States Patent [19]
Iwata

[11] Patent Number: 4,499,877
[45] Date of Patent: Feb. 19, 1985

[54] IGNITION TIMING CONTROL DEVICE FOR AN INTERNAL COMBUSTION ENGINE
[75] Inventor: Toshio Iwata, Himeji, Japan
[73] Assignee: Mitsubishi Denki Kabushiki Kaisha, Tokyo, Japan
[21] Appl. No.: 329,352
[22] PCT Filed: Apr. 23, 1981
[86] PCT No.: PCT/JP81/00096
    § 371 Date: Dec. 8, 1981
    § 102(e) Date: Dec. 8, 1981
[87] PCT Pub. No.: WO81/03049
    PCT Pub. Date: Oct. 29, 1981
[30] Foreign Application Priority Data
    Apr. 23, 1980 [JP] Japan .................................. 55-55682
[51] Int. Cl.³ .............................................. F02P 5/14
[52] U.S. Cl. ........................................ 123/425; 73/35
[58] Field of Search ...................... 123/425, 435; 73/35

[56] References Cited
U.S. PATENT DOCUMENTS
4,111,035  9/1978  West et al. ................................ 73/35
4,153,020  5/1979  King et al. ................................ 73/35
4,276,861  7/1981  Kearney et al. ...................... 123/425
4,368,635  1/1983  Yoshida .................................. 73/35

Primary Examiner—Andrew M. Dolinar
Attorney, Agent, or Firm—Wenderoth, Lind & Ponack

[57] ABSTRACT

This invention enables substantially ideal ignition timing to be achieved by suitably detecting a knocking signal while avoiding interference from the various noise components in the output of a vibrational acceleration sensor on an engine, and controlling the ignition timing in response to the knocking signal, and even if, for whatever reason, a noise signal is erroneously detected as a knocking signal, the erroneous detection is invalidated so as to allow suitable ignition timing control in response to the real knocking signal.

10 Claims, 4 Drawing Figures

IGNITION TIMING CONTROL DEVICE FOR AN INTERNAL COMBUSTION ENGINE

BACKGROUND OF THE INVENTION

1. Technical Field of the Invention

This invention relates to an ignition timing control device for internal combustion engines which controls the ignition timing in response to a knocking state of the engine.

2. Description of the Prior Art

The setting of the ignition timing for an internal combustion engine is carried out for optimum efficiency with regard to the operating state of the engine. In general, it is desirable to set the ignition timing to approach MBT (Minimum advance for Best Torque) as nearly as possible within a range in which knocking, or delayed detonation of unburned pockets of fuel, within the engine does not occur. However, the conventionally employed ignition timing control devices have mostly been mechanical, with ignition advance characteristics that are inconsistent, due to production tolerances and variations due to age. For this reason, it has been necessary to avoid knocking in practice by setting the ignition timing somewhat retarded of the ignition advance characteristics. This has adversely affected the efficiency of the engine. Furthermore, even if an ignition timing control device without production tolerances and variations with age could be provided, the knocking phenomenon itself is influenced by factors such as the temperature and humidity of the engine's intake air, as well as the air-fuel mix ratio, etc., such that setting the ignition timing to avoid knocking under a certain set of conditions cannot eliminate the possibility of knocking under a different set of operating conditions.

In this situation, it is possible to apply a system of detecting the onset of knocking to control the ignition timing in such a way that knocking virtually never occurs, even when errors in the ignition advance characteristics arise due to the aforementioned mechanical tolerances or differences in the operating conditions. Essentially, this means appropriately retarding the ignition timing at the onset of knocking, so as to eliminate knocking.

There are various methods for detecting the onset of knocking, including measuring the pressure inside the combustion chamber, measuring the vibrational acceleration of the engine, and measuring the sound produced by the engine, etc., but in terms of practical application, from considerations such as the siting of the detector and signal processing, etc., the method whereby the vibrational acceleration of the engine is measured is regarded as the most practical. However, with this method, mechanical vibration noises that are unconnected with the knocking produced by the engine are picked up simultaneously with the knocking signal, and so it is necessary to discriminate the knocking signal from among the mechanical vibration noises.

SUMMARY OF THE INVENTION

It is an object of this invention to make possible ignition timing control for good engine efficiency by retarding the ignition timing in response to a knocking stae of the engine, so as to suppress the production of such knocking.

This and other objects of the present invention are achieved by providing in a discrimination circuit for the discrimination of a knocking signal component in the output of a vibration sensor, a level detecting means which accepts the vibration sensor output and generates a comparative signal level responsive to the noise signal level thereof, a comparator which distinguishes by level a knocking signal by comparing the comparative signal level and the vibration sensor output, and a feedback means which prevents the passage of the vibration sensor output with regard to the level detection means when the comparator generates an output and which inverts the magnitude relationship of the various inputs to the comparator when the compartor's output continues for at least a predetermined duration so as to cause the production of the output of the comparator to cease, whereby the level of the knocking signal is accurately distinguished to enable suitable control of the ignition timing to be effected with regard to knocking, and whereby even if a noise signal is erroneously detected as knocking, after the passage of a predetermined period of time, the erroneous detection is automatically invalidated so as to restore ignition timing control in accordance with true knocking.

DESCRIPTION OF THE PREFERRED EMBODIMENT

Figure 1:
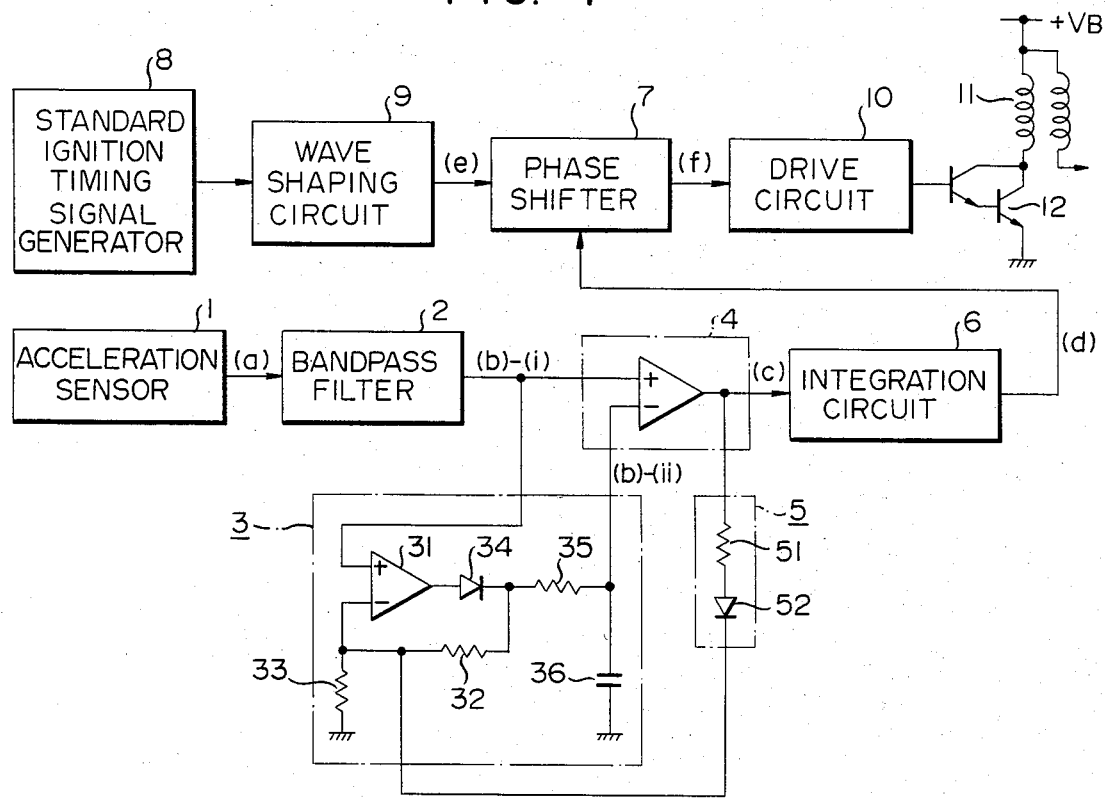
FIG. 1 is a circuit/block diagram showing an embodiment according to the present invention.

FIG. 1 is a hybrid electrical circuit/block diagram showing a preferred embodiment of the present invention, wherein an acceleration sensor (1) which detects the vibrational acceleration of an engine is fitted to an engine (not shown); the output from the acceleration sensor (1) passes through a bandpass filter (2) having high sensitivity with regard to the knocking in the output signal, and which allows a certain frequency component to pass; a noise level detector (3) comprises an amplifier (31) which amplifies the output from the bandpass filter (2) to a slightly higher voltage, resistances (32) and (33), a diode (34), and a resistance (35) and a capacitor (36) which constitute an integrator; the detector detects the level of the mechanical vibration noise which is not connected with the knocking in the engine. A comparator (4) compares the output voltage from the aforementioned bandpass filter (2) with the output voltage from the aforementioned noise level detector (3), and produces a knocking detection pulse; and a feedback circuit (5), comprising a resistance (51) and a diode (52), constitutes the charging circuit for the aforementioned capacitor (36), and which lowers the inverted input terminal voltage of the aforementioned amplifier (31) so as to prevent the passage of the output from the aforementioned bandpass filter (2) during a time when the aforementioned knocking detection pulse is produced. An integrator (6) integrates the output pulse of the comparator (5) and produces an integration voltage corresponding to the strength of the knocking in the engine; a phase shifter (7) retards the phase of a standard ignition signal in accordance with the output voltage of the integrator (6), and a standard ignition timing signal generator (8) that generates a standard ignition signal in accordance with pre-established ignition timing characteristics (which are established at least within the knocking range in which engine knocking occurs) and is normally housed within the distributor, is operated to obtain the abovementioned ignition timing characteristics. A waveshaping circuit (9) shapes the output waveform of the standard ignition timing signal generator (8), and at the same time controls the closing angle for passing the current from the ignition coil, a drive circuit (10) switches a Darlington output transistor (12) in series with a power supply circuit of the ignition coil (11), in accordance with the output signal from the phase shifter (7).

Figure 2:
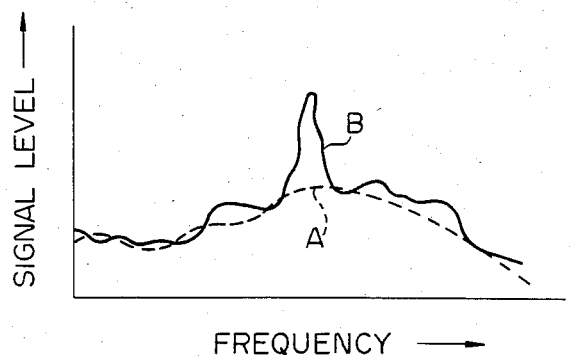
FIG. 2 is a frequency vs. amplitude curve of the acceleration sensor of FIG. 1.

In FIG. 2 is shown a curve of the frequency characteristics of the output signal from the acceleration sensor (1). The broken line (A) represents the output without any knocking, and the solid line (B) represents the output when knocking is present. The output signal of the acceleration sensor (1) includes both the knocking signal and mechanical noise signal which is not connected unconnected with the knocking in the engine, as well as various noise components that find their way into the signal transmission path.

Comparing the characteristics of (A) and (B) in FIG. 2, it will be seen that there is a distinctive frequency characteristic to the knocking signal. Differences in the characteristic distribution occur in accordance with differences in the engines, or differences in the siting of the acceleration sensor, but a clear difference always exists between the absence and existence of knocking. Therefore, by allowing a frequency component to pass which includes this knocking signal, it is possible to effectively suppress noises of other frequency components, thereby enabling the knocking signal to be detected effectively detected.

Figure 3:
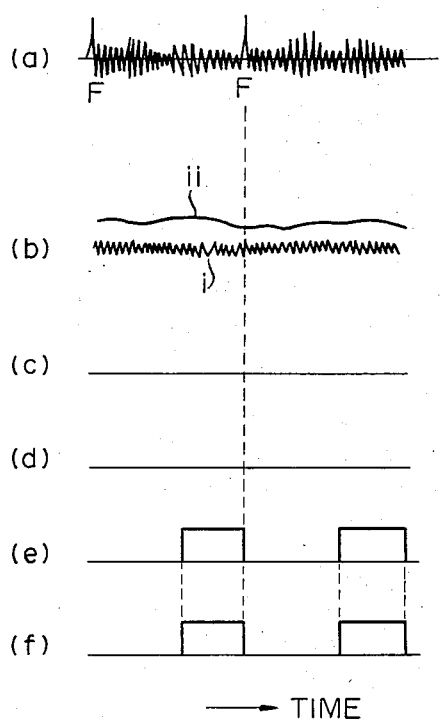
FIGS. 3 and 4 are operational waveforms of various parts in FIG. 1.
Figure 4:
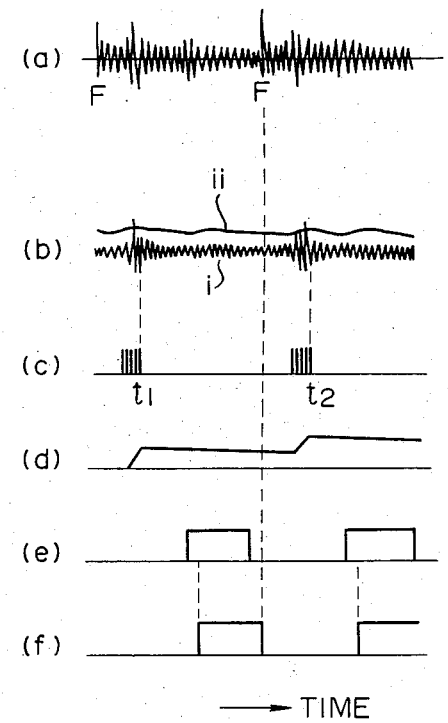

FIGS. 3 and 4 show the operational waveforms of various portions of FIG. 1; FIG. 3 shows the mode in which there is an absence of engine knocking, and FIG. 4 shows the mode in which knocking exists.

Next the operation of this embodiment is explained.

A standard ignition timing signal generated by the standard ignition timing signal generator (8) in accordance with ignition timing characteristics predetermined to be in accordance with the rotation of the engine, is wave-shaped into a pulse with a desired closing angle, by the waveshaping circuit (9), to drive the output transistor (12) via the phase shifter (7) and the drive circuit (10), intermittently interrupting the current passing through the ignition coil (11), whereby the engine is driven by suitably timed ignition of an air-fuel mixture fed into the combustion chamber or chambers of the engine, by an ignition voltage from the ignition coil (11), produced when the aforementioned current flow is interrupted. During operation of the engine, certain vibrations are produced, and these are detected by means of the acceleration sensor (1).

At this point, if no knocking is produced in the engine, no knocking induced mechanical vibrations will be produced, but mechanical vibrational noises due to other mechanical vibrations will be produced in the output signal of the acceleration sensor (1), as shown in FIG. 3(a). This noise signal is passed through the bandpass filter (2) wherein as shown by FIG. 3(b), the level of the output noise component is lowered because the mechanical noise component, apart from a specific band, is suppressed. The vibration output from the bandpass filter (2) is voltage amplified to a slightly higher voltage level by the amplifier (31) of the level detector (3), the degree of this voltage amplification being determined by the resistance values of the resistances (32) and (33). This voltage amplified vibration output from the amplifier (31) charges the capacitor (36) via the resistance (35), and discharges it via the resistances (35), (32) and (33), whereby it is transformed into a direct current voltage. The charge and discharge time constant in this instance is set a value such that mild changes in the peak voltage level in the output signal from the amplifier (31), such as those which occur with mechanical vibration noises that are not a knocking signal, are responded to, and so the level output is a direct current voltage which slightly higher than the mechanical vibration noise peak value (Refer to FIG. 3(b)-(ii)). Accordingly, the output voltage of the noise level detector (3) is greater than the output signal voltage from the bandpass filter (2), and so the output of the comparator (4) that compares them produces absolutely no output, as shown in FIG. 3(c), and consequently the noise signal is removed entirely. Thus, the output voltage of the integrator (6) is zero, as shown in FIG. 3(d), and so the phase shift produced by the phase shifter (7) (the phase difference between input and output (FIGS. 3(e) and (f))), is also zero. Consequently, the intermittent phase of the current passing through the ignition coil (11) is the same as the phase of the output of the waveshaping circuit (9), and the engine's ignition timing in the standard ignition timing based on the standard ignition timing signal from the standard ignition timing signal generator (8), and the ignition timing is not retarded.

Next, the situation where knocking occurs is as shown in FIG. 4, with a knocking signal at a time delayed by a certain amount after the ignition timing point (FIGS. 4(a) to (f)), as shown in FIG. 4(a), being included in the acceleration sensor's output. This signal is passed through the bandpass filter (2), after which, as shown in FIG. 4(b) (i), the knocking signal is overlaid with considerable magnitude on top of the mechanical vibration noise unrelated to the knocking. Also, in the output signal from the aforementioned bandpass filter (2), the rise and fall of the knocking signal is extremely fast, and so the charge and discharge response of the capacitor (36) in the noise level detector (3) falls behind, and so the output voltage level becomes substantially constant, not rising in response to the knocking signal level, as shown in FIG. 4(b) (ii).

The result of this is that voltages shown by FIGS. 4(b) (i) and 4(b) (ii) are input to the inputs to the comparator (4), and so a pulse is produced that appears in the output of the comparator (4) in response to the knocking signal, as shown in FIG. 4(c). Subsequently, the integrator (6) integrates this pulse, producing an integration voltage as shown in FIG. 4(d). Then, in response to the voltage output of the integrator (6) the phase shifter (7) retards the output signal (FIG. 4(e)) from the waveshaping circuit (9), whereby the output voltage pulse from the phase shifter (7) is retarded in relation to the phase of the output voltage pulse from the waveshaping circuit (9), as shown in FIG. 4(f), and the drive circuit (10) drives the output transistors (12) at this phase, so the retardation angle of the ignition timing is controlled in accordance with the strength of the knocking phenomenon, to retard the ignition behind the predetermined standard ignition timing, thus suppressing the generation of knocking, and controlling the ignition timing so that it is ultimately substantially ideal.

At this point, when the comparator (4) produces a knocking detection signal, the knocking detection signal raises the inverted input terminal voltage of the amplifier (31) to the input voltage of the noninverted input terminals, or higher, via the resistance (51) and the diode (52) of the feedback circuit (5). For this reason, the charging, by the output of the amplifier (31), of the capacitor (36), which had been integrating level the output of the amplifier (31) ceases, and so the output of the noise level detector (3), i.e. the comparative voltage level from the comparator (4), does not increase during a period in which the knocking signal is produced, and even in the vicinity of the time points ($t_1$, $t_2$) at which the knocking signal terminates, the level is substantially the same as that immediately prior to the occurrence of knocking, and so the comparator (4) is able to accurately determine the knocking signal level to appropriately control the ignition timing.

However, in a case when, as described above, a voltage rise in the capacitor (36) is prevented by the output of the comparator (4), if a noise signal of a level lower than the knocking signal is erroneously detected by the comparator (4) as a knocking signal, even momentarily, when, for whatever reason, the output voltage level of the noise level detector (3) becomes lower than the noise level in the output from the bandpass filter (2), the erroneous detection signal prevents the production of an output from the amplifier (31), and so the output voltage level of the noise level comparator (3) is kept low. Thus, although there is the possibility that the comparator's erroneous detection output may continue for a relatively long period of time, with the device of the present invention, the charging of the capacitor (36) by the output of the bandpass filter (2) via the resistance (51) and the diode (52) of the feedback circuit is prevented by the detection output of the comparator (4), while the capacitor is charged with a large time coefficient determined by the resistances (32), (35) and (51), and after a predetermined time the output level of the level detector (3) is always raised to the noise level of the output from the bandpass filter (2) of the input of the comparator (4), or higher, and the generation by the comparator (4) of an erroneous detection signal over a long period of time is prevented, allowing restoration to correct operation. In these circumstances, if the resistance values of the resistances (35), (32) and (51) are selected such that the time constant for charging the capacitor (36) by means of the output of the comparator (4) is sufficiently larger (several tens to several hundred times) than the time constant by means of the output of the amplifier (31), it will be possible to suitably discriminate the level of the knocking signal; without in practice raising the comparative level of the comparator (4) during the period in which knocking is produced in the output of the bandpass filter (2), and even if the comparative level were for some reason to fall below the noise signal level, such that a noise signal might be erroneously detected, after the passage of a predetermined period of time, correct operation is automatically restored.

Thus, in an embodiment as hereinabove described, when the comparator (4) produces a detection output, the charging of the comparative level generating capacitor (36) by the output of the bandpass filter (2) is prevented, while the capacitor (36) is charged by the output of the abovementioned detector via a circuit with a sufficiently large time constant, and, after a predetermined period of time the various inputs of the comparator (4) are inverted in terms of their magnitude relationship.

This invention comprises a means of controlling the ignition timing of an internal combustion engine in response to a state of knocking in that engine, comprising charging a capacitor by means of the detection output of a comparator via a circuit with a sufficiently large time constant, and, after a predetermined period of time, inverting the magnitude relationship of the inputs of the comparator, but may equally be applied to ignition timing controls for internal combustion engines, provided with a timer circuit to measure the sustain time of the comparator's detection output, the capacitor being rapidly charged after the passage of the sustain time, causing the magnitude relationship of the various inputs to the comparator to be inverted so as to invalidate erroneous detections.

I claim:

1. An ignition timing control device for an internal combustion engine of a vehicle, which comprises:
   a signal generating means for generating a standard ignition timing signal;
   a vibration detecting means for generating a signal having a noise signal component and a knocking signal component, said signal being generated in response to the vibrations of said engine;
   a noise level detecting means for generating a comparative signal in response to said noise signal component, said comparative signal normally being larger in value than said noise signal component;
   a comparator, having one input which is connected to an output of said vibration detecting means and having another input which is connected to an output of said noise level detecting means, for comparing said signal from said vibration detection means with said comparative signal from said noise level detecting means, and for preventing said noise signal component from passing therethrough, thereby allowing only said knocking signal component to appear at its output;
   an integration circuit whose input is connected to said output of said comparator for integrating said knocking signal component on said output of said comparator;
   a phase shifting means for controlling a phase retard angle of said standard ignition timing signal in response to said integrated knocking signal component on an output of said integrator; and
   a switching means connected to an output of said phase shifting means, for intermittently interrupting a power supply which is connected to an ignition coil of said vehicle in response to a phase retarded ignition timing signal from said phase shifting means, so as to thereby eliminate knocking in said engine;
   further comprising:
   a feedback means for preventing said noise signal component from erroneously appearing on said output of said comparator when said noise signal component continues to appear on said output of said comparator for a predetermined time.

2. An ignition timing control device for an internal combustion engine having a switching means for intermittently interrupting a power supply to an ignition coil, a signal generator for generating a standard ignition timing signal for controlling the switching of said switching means, a vibration sensor for detecting vibration of said engine, a discrimination circuit for eliminating a noise signal component and for discriminating a knocking signal component in an output from said vibration sensor, and a phase shifting means for controlling a phase retard angle of said standard ignition timing signal in response to an output from said discrimination circuit so as to control the switching timing of said switching means, wherein said discrimination circuit comprises:
- a level detection means connected to said output of said vibration sensor for generating a comparative signal which corresponds to a level of said noise signal component, said comparative signal having a level which is normally larger in value than that of said noise signal component;
- a comparator having a first input which is connected to said output of said vibration sensor and having another input which is connected to an output of said level detection means, for distinguishing said knocking signal from said noise signal component by comparing said output of said vibration sensor and said level of said comparative signal; and
- a feedback means for preventing said noise signal component from appearing on an output of said comparator when said output of said comparator continues to appear for a predetermined time due to said noise signal component having a level which is larger in value than that of said comparative signal for said predetermined time.

3. An ignition timing control means for an internal combustion engine as claimed in claim 2, wherein said discrimination circuit further comprises a bandpass filter for passing a knocking signal frequency component in said output signal of said vibration sensor.

4. An ignition timing control means for an internal combustion engine as claimed in claim 3, wherein said level detection means is provided with an integrator comprising a capacitor charged by an output from said bandpass filter.

5. An ignition timing control means for an internal combustion engine as claimed in claim 4, wherein said capacitor of said integrator is charged by means of said detection output of said comparator, whereby the magnitude relationship of said first and another comparator inputs is inverted after the passage of a predetermined period of time.

6. An ignition timing control means for an internal combustion engine as claimed in claim 2, wherein said level detector is a noise level detection means which detects a mechanical vibration noise level of said engine.

7. An ignition timing control means for an internal combustion engine as claimed in claim 6, wherein said level detection means comprises an amplifier for amplifying the output from said bandpass filter.

8. An ignition timing control means for an internal combustion engine as claimed in claim 7, wherein an output of said amplifier is connected to an integrator via a diode, and an output of said feedback means is connected to said integrator via a resistance.

9. An ignition timing control means for an internal combustion engine as claimed in claim 2, wherein said feedback means comprises at least one resistance and at least one diode.

10. An ignition timing control means for an internal combustion engine as claimed in claim 2, wherein the sustain time of said comparator's detection is measured by a timer circuit, and when said sustain time reaches a predetermined value, the magnitude relationship of said first and another inputs comparator is inverted.

* * * * *